(12) United States Patent
Catania

(10) Patent No.: US 6,533,301 B1
(45) Date of Patent: Mar. 18, 2003

(54) STABILIZER BAR DIRECT CONNECT INSERT

(75) Inventor: Michael Vito Catania, Clarkston, MI (US)

(73) Assignee: Meritor Suspension Systems Company, Troy, MI (US)

( * ) Notice: Subject to any disclaimer, the term of this patent is extended or adjusted under 35 U.S.C. 154(b) by 265 days.

(21) Appl. No.: 09/610,015

(22) Filed: Jul. 1, 2000

(51) Int. Cl.[7] ............ B60G 7/00; B60P 7/00; B62D 7/00; B25G 3/00; B25G 3/20; F16B 21/00; F16B 39/22; F16B 13/06

(52) U.S. Cl. ............ 280/124.13; 280/124.152; 403/367; 403/260; 411/339; 411/301; 411/55

(58) Field of Search .......... 280/124.152, 124.13; 403/374.1, 365, 367, 370, 261, 260; 411/339, 301, 55, 69, 338

(56) References Cited

U.S. PATENT DOCUMENTS

| | | | |
|---|---|---|---|
| 3,687,181 A | | 8/1972 | Coyle |
| 4,878,791 A | * | 11/1989 | Kurihara et al. ............ 411/55 |
| 5,030,051 A | * | 7/1991 | Kaneko et al. ............ 411/55 |
| 5,224,506 A | * | 7/1993 | Allen et al. ............ 403/260 |
| 5,246,323 A | * | 9/1993 | Vernet et al. ............ 411/55 |
| 5,248,231 A | * | 9/1993 | Denham et al. ............ 411/69 |
| 5,259,714 A | * | 11/1993 | Campbell ............ 411/55 |
| 5,490,750 A | * | 2/1996 | Gundy ............ 411/55 |
| 5,580,204 A | * | 12/1996 | Hultman ............ 411/339 |
| 5,641,256 A | * | 6/1997 | Gundy ............ 411/55 |
| 5,692,865 A | * | 12/1997 | Pratt ............ 411/55 |
| 5,938,384 A | * | 8/1999 | Pratt ............ 411/55 |
| 5,954,353 A | * | 9/1999 | Kincaid et al. ............ 280/124.152 |
| 5,957,642 A | * | 9/1999 | Pratt ............ 411/55 |
| 5,975,820 A | * | 11/1999 | Kirchen ............ 411/339 |
| 6,007,080 A | * | 12/1999 | Kincaid et al. ............ 280/124.152 |
| 6,044,670 A | * | 4/2000 | Citurs et al. ............ 411/55 |
| 6,074,119 A | * | 6/2000 | Schlanger ............ 411/55 |
| 6,076,840 A | * | 6/2000 | Kincaid et al. ............ 411/55 |

FOREIGN PATENT DOCUMENTS

FR 2 761 009 A 9/1998

OTHER PUBLICATIONS

European Search Report dated Sep. 5, 2001.

* cited by examiner

Primary Examiner—Paul N. Dickson
Assistant Examiner—Joselynn Y Sliteris
(74) Attorney, Agent, or Firm—Carlson Gaskey & Olds, P.C.

(57) ABSTRACT

An expandable insert secures a linkage bolt to the ends of a stabilizer bar. The insert comprises a cylindrical body portion, a cap, and an aperture. The insert is placed in the end of a stabilizer bar. As the linking bolt is torqued within the aperture of the insert, the threads of the linking bolt penetrate the insert. The torquing expands the insert outwardly towards the interior surface of the stabilizer bar, anchoring the insert inside the stabilizer bar and securing the linkage bolt to the end of the stabilizer bar.

10 Claims, 2 Drawing Sheets

STABILIZER BAR DIRECT CONNECT INSERT

BACKGROUND OF THE INVENTION

The present invention relates generally to a stabilizer bar for a vehicle suspension system having a direct connect insert which expands as a linkage bolt is torqued within the insert, anchoring the insert within the stabilizer bar and attaching the stabilizer bar to the linkage bolt.

Vehicles are commonly equipped with suspension systems for absorbing road shock and other vibrations, while providing for a smooth and comfortable ride. A stabilizer bar is often used to increase roll rigidity and to improve the steering stability of the vehicle. The stabilizer bar is installed across the frame of the vehicle to control sway when the vehicle turns.

Various types of connections have been utilized to connect a stabilizer bar to a vehicle. In a first type of connection, ends of the stabilizer bar are heat formed, welded, or crimped to an attaching linkage. Another type of connection utilizes a rubber bushing which is attached around the exterior surface of the end of the stabilizer bar. This type of connection pinches into the rubber bushing. In a third type connection, a threaded linkage bolt is inserted into the end of the stabilizer bar and torqued, threading the linkage bolt directly into the interior surface of the stabilizer bar.

Each of the abovementioned methods of attachment have drawbacks. If the ends of the stabilizer bar are formed, welded, or crimped to the attaching linkage, additional detail to the ends of the bar is required, resulting in extra time and expense. The captured rubber bushing is not an acceptable attachment for many applications.

It is also disadvantageous to thread the linkage bolt directly into the interior of the stabilizer bar. This threading operation requires that the stabilizer bar be of a specific inner diameter such that the linkage bolt contacts and threads into the interior surface of the stabilizer bar. Therefore, either the thread size of the linkage bolt or the inner diameter of the stabilizer bar must be altered for a proper fit.

The stabilizer bar must consist of a material of a certain hardness in order to permit threading. If the stabilizer bar is too hard, the linkage bolt will be unable to thread into the interior surface, creating a weak fit. The hardness of the stabilizer bar is increased by heat treatment. Small stabilizer bars have a low stress design and do not require heat treatment. However, if a larger stabilizer bar is needed, heat treatment is required. Thus, with the prior art threading specific attention must be given to the heating process to insure that the ends of the stabilizer bar are not heated and therefore hardened.

Hence, there is a need in the art for a stabilizer bar connection method which does not require complex machining operations.

SUMMARY OF THE INVENTION

An inventive embodiment includes a stabilizer bar with a direct connect insert installed into the end of a stabilizer bar to receive a threaded linkage bolt which connects the stabilizer bar to the vehicle. As the linking bolt is torqued, the threads of the linkage bolt penetrate the insert, causing it to expand outwardly towards the interior surface of the stabilizer bar, creating an interference fit.

In a first embodiment, the insert is placed into the end of a stabilizer bar. The insert is comprised of a generally cylindrical shaped body portion having a slightly smaller diameter than the inner diameter of the stabilizer bar. An annular cap has a diameter larger than the inner diameter of the stabilizer bar and abuts the end of the stabilizer bar. A uniform aperture of sufficient diameter to receive a linkage bolt extends through the body portion and the cap of the insert. As a linkage bolt is torqued inside the aperture of the insert, the insert expands outwardly towards the interior surface of the stabilizer bar. This anchors the insert within the stabilizer bar and secures the end of the stabilizer bar to the linkage bolt.

In another embodiment, the insert is placed into the end of a stabilizer bar which tapers at its end, creating a shallow extrusion. This extrusion creates a shoulder that allows for improved anchoring of the expanding insert within the stabilizer bar as the locking bolt is torqued, increasing the locking ability of the insert within the stabilizer bar.

Accordingly, the present invention provides a stabilizer bar direct connect insert composed of an expansive material which is added to the end of a stabilizer bar in order to attach the stabilizer bar to a threaded linkage bolt.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
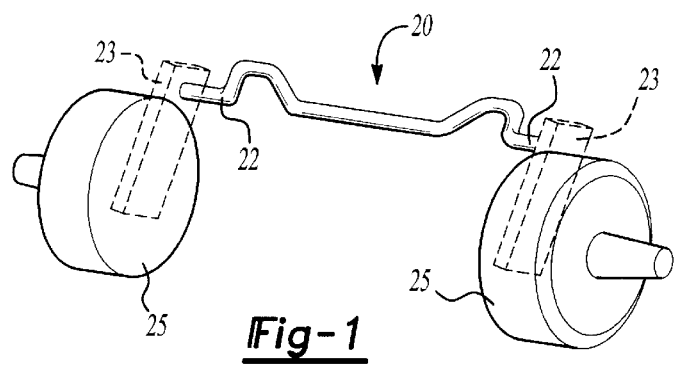
FIG. 1 illustrates a schematic view of a stabilizer bar mounted into a vehicle suspension system.

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

FIG. 1 illustrates a schematic view of a stabilizer bar 20 of a vehicle suspension system.

As shown schematically ends 22 are attached to suspension components 23, which move with the wheels 25.

Figure 2:
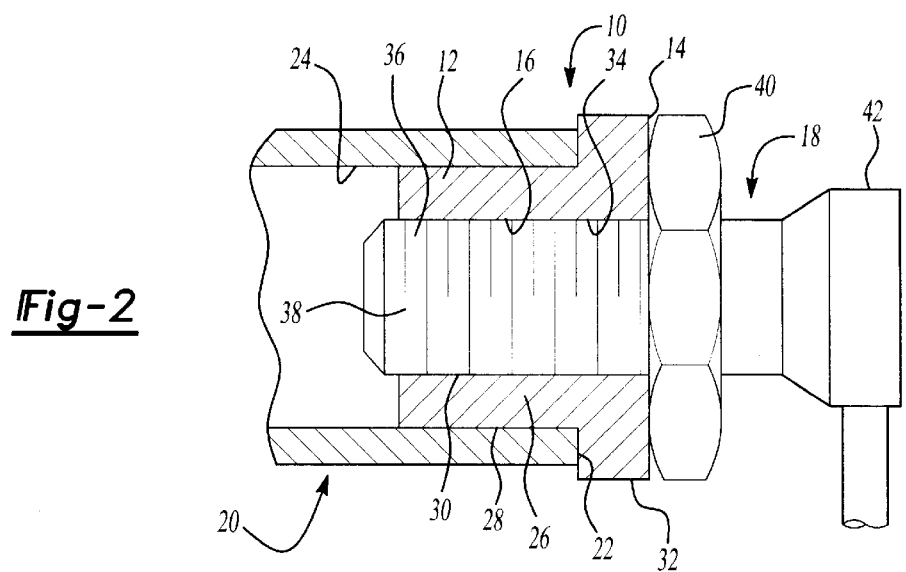
FIG. 2 is a cross sectional view of a stabilizer bar direct connect insert inserted into a stabilizer bar and secured with a linkage bolt.
Figure 3:
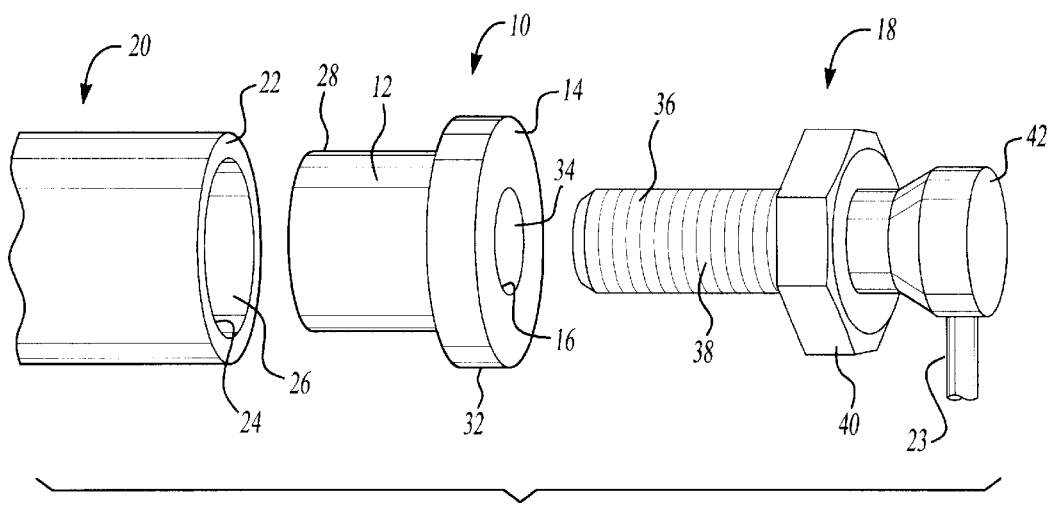
FIG. 3 illustrates an exploded view of a stabilizer bar direct connect insert, a stabilizer bar, and a linkage bolt.

As shown in FIGS. 2 and 3, to attach components 23 a direct connect insert 10 is inserted into a stabilizer bar 20 having ends 22 with an opening 26 and an interior surface 24. The insert 10 connects the stabilizer bar 20 to a threaded linkage bolt 18. Bolt 18 is in turn connected to component 23, such as by stud 42, disclosed below. In the preferred embodiment, the stabilizer bar 20 is tubular. If the stabilizer bar is solid, the ends 22 are hollow in order to define an interior surface 24 and an opening 26.

Figure 4:
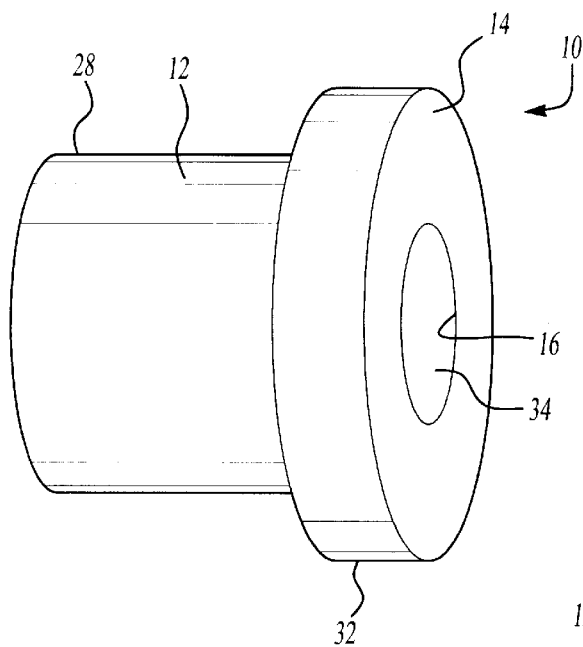
FIG. 4 illustrates a perspective view of a stabilizer bar direct connect insert.
Figure 5:
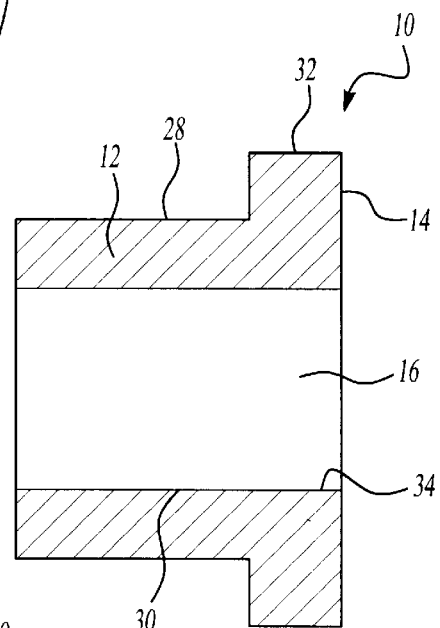
FIG. 5 illustrates a cross sectional view of a stabilizer bar direct connect insert.

FIGS. 4 and 5 illustrate the insert 10. In the disclosed embodiment, the insert 10 includes a generally cylindrical shaped body portion 12, an annular cap 14, and an aperture 16. The aperture 16 is of sufficient diameter to receive a threaded linkage bolt 18 and extends through both the body portion 12 and cap 14. In the preferred embodiment, the insert 10 is comprised of a material that will readily expand.

Now referring again to FIGS. 2 and 3, the body portion 12 of the insert 10 has an outer surface 28 and an inner surface 30. The diameter of the body portion 12 is preferably slightly smaller than the diameter of the opening 26 of the stabilizer bar 20. The body portion 12 is inserted into the opening 26 of the stabilizer bar 20 such that the outer surface 28 of the body portion 12 is proximate to the interior surface 24 of the stabilizer bar 20. The cap 14 also has an outer surface 32 and an inner surface 34. The cap 14 is of larger diameter than the opening 26 of the stabilizer bar 20 and abuts its end 22.

Once the insert 10 is placed inside the stabilizer bar 20, the stabilizer bar 20 can be secured to the threaded linkage bolt 18. The linkage bolt 18 as illustrated includes an elongated member 36 with threads 38, a hex head 40, and a ball stud 42. The hex head 40 is located on the elongated member 36 substantially proximate to the ball stud 42 to provide pressure on the cap 14 of the insert 10. Of course, other types of threaded members can be used.

As the linkage bolt 18 is torqued, the elongated member 36 enters the insert 10 and threads 38 penetrate the inner surface 30, 34 of the body portion 12 and the cap 14 of the insert 10, causing the outer surface 28 of the body portion 12 to expand towards the interior surface 24 of the stabilizer bar 20. This creates an interference fit, anchoring the insert 10 within the stabilizer bar 20 and attaching the stabilizer bar 20 to the threaded linkage bolt 18. Additionally, as the linkage bolt 18 is torqued, the hex head 40 places direct pressure on the cap 14 of the insert 10, further stabilizing the insert 10.

Once the insert 10 is secured within the stabilizer bar 20 as shown in FIG. 2, its novel advantages will become apparent. For one, by using an insert 10, no end forming (such as crimping or welding) is required, saving time and expense. Additionally, neither the diameter of the stabilizer bar 20 nor the thread 38 size of the linkage bolt 18 needs to be machined or altered for a proper fit. Rather, the geometry of the insert 10 can be modified to a create a secure fit of the linkage bolt 18 and the stabilizer bar 20.

Additionally, the hardness of the material of the stabilizer bar 20 is not a factor because the threads 38 of the linkage bolt 18 do not penetrate the stabilizer bar 20, but rather penetrate the insert 10, which in turn expands towards the interior surface 24 of the stabilizer bar 20. Therefore, no special attention needs to be given to the design or heat treatment of the stabilizer bar 20.

Figure 6:
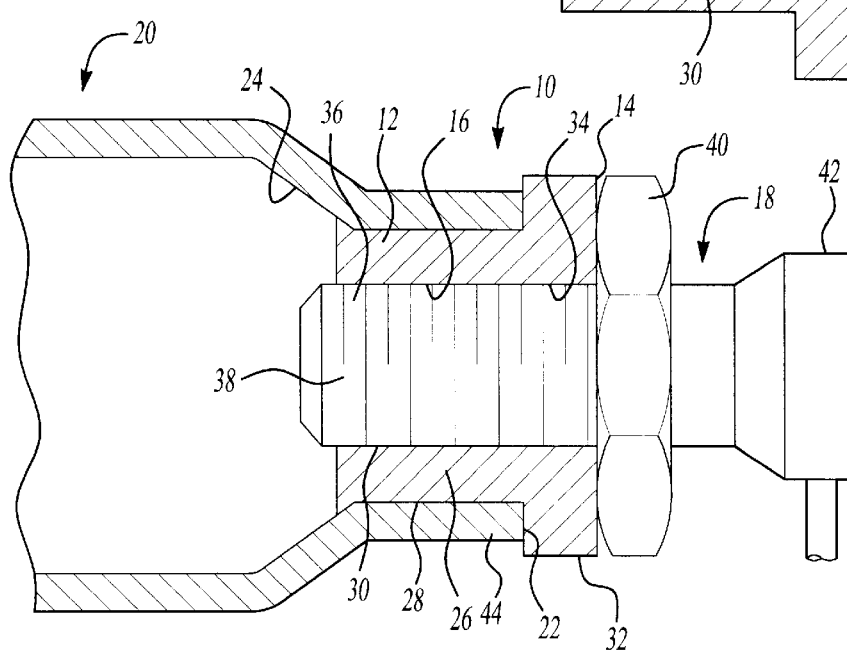
FIG. 6 illustrates a cross sectional view of a stabilizer bar direct connect insert inserted into a tapered stabilizer bar and secured with a linkage bolt.

FIG. 6 illustrates an alternative embodiment of the present invention. In this embodiment, the ends 22 of the stabilizer bar 20 are tapered inwardly, creating a shallow extrusion 44. The shallow extrusion 44 provides a shoulder on the interior surface 24 of the stabilizer bar 20, improving the anchoring of the insert 10 within the stabilizer bar 20.

Accordingly, the present invention provides a stabilizer bar direct connect insert 10 of varying geometries which can be added to the end 22 of a stabilizer bar 20 for attachment of the stabilizer bar 20 to a linkage bolt 18 which connects the stabilizer bar 20 to the vehicle.

The insert 10 may be formed of appropriate materials such as soft metal or plastics. Most preferably, the insert is more expandable and softer than the material of the bar ends 22 and the bolts 18.

The foregoing description is exemplary rather than defined by the limitations within. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A stabilizer bar attachment system of a vehicle suspension system comprising:

a stabilizer bar having a pair of ends, each end having an opening defining an interior surface of an interior dimension;

a pair of expandable bushings sized to fit in each of said openings of said stabilizer bar, each of said bushings including an aperture to receive a threaded linkage and a cap having an outer diameter larger than said interior dimension of said stabilizer bar to abut said ends of said stabilizer bar;

a pair of threaded linkages, with each of said ends of said stabilizer bar secured to one of said threaded linkages by a respective bushing, said bushings inserted into said ends of said stabilizer bar, and said bushings expanding outwardly towards said interior surface of said stabilizer bar as said linkage is turned within said aperture, securing said bushings within said stabilizer bar.

2. The system as recited in claim 1 wherein said threaded linkages further comprises a head for pressuring said cap onto said end of said stabilizer bar.

3. The system as recited in claim 2 wherein said head is a hex head.

4. The system as recited in claim 1 wherein said bushings have an outer diameter slightly smaller than said interior dimension of said stabilizer bar.

5. The system as recited in claim 1 wherein said ends of said stabilizer bar further comprise a shallow extrusion.

6. The system as recited in claim 1 wherein said bushings are formed of a material that is softer and more expandable than the material of said stabilizer bar and said threaded linkages.

7. A vehicle suspension system comprising:

a stabilizer bar having a pair of end, each end having an opening defining an interior surface of an interior diameter;

a pair of expandable bushings being generally cylindrical and sized to fit in each of said openings of said stabilizer bar, and having an aperture to receive a threaded linkage and a cap having an outer diameter larger than said interior diameter of said stabilizer bar to abut said end of said stabilizer bar; and a pair of threaded linkages each having a head to provide pressure on said cap of said bushings, with said ends of said stabilizer bar being secured to one of said threaded linkages by said bushings, said bushings inserted into each said end of said stabilizer bar, and said bushings expanding outwardly towards said interior surface of said stabilizer bar as said threaded linkage is turned within said aperture, securing said bushing within said stabilizer bar.

8. The system as recited in claim 7 wherein said end of said stabilizer bar further comprise a shallow extrusion.

9. The system as recited in claim 7 wherein said bushings are formed of a material that is softer and more expandable than the material of said stabilizer bar and said threaded linkages.

10. The system as recited in claim 7 wherein said bushing have an outer diameter slightly smaller than said interior diameter of said stabilizer bar.

* * * * *

UNITED STATES PATENT AND TRADEMARK OFFICE
CERTIFICATE OF CORRECTION

PATENT NO.    : 6,533,301 B1
DATED         : March 18, 2003
INVENTOR(S)   : Michael Vito Catania It is certified that error appears in the above-identified patent and that said Letters Patent is hereby corrected as shown below:

Column 4,
Line 56, "end" should be -- ends --.

Signed and Sealed this

Tenth Day of June, 2003

JAMES E. ROGAN
*Director of the United States Patent and Trademark Office*